United States Patent [19]

Karlsson

[11] Patent Number: 5,206,923

[45] Date of Patent: Apr. 27, 1993

[54] METHOD TO USE AN OPTICAL FIBRE AS A SENSOR

[76] Inventor: Stefan U. Karlsson, Rönnbärsgatan 2, S-590 50 Vikingstad, Sweden

[21] Appl. No.: 761,358

[22] PCT Filed: Feb. 14, 1990

[86] PCT No.: PCT/SE90/00094

§ 371 Date: Sep. 9, 1991

§ 102(e) Date: Sep. 9, 1991

[87] PCT Pub. No.: WO90/10883

PCT Pub. Date: Sep. 20, 1990

[30] Foreign Application Priority Data

Mar. 8, 1989 [SE] Sweden ................................ 8900805

[51] Int. Cl.$^5$ ............................................. G02B 6/26
[52] U.S. Cl. ......................................... 385/12; 385/13; 385/24; 356/350
[58] Field of Search ........................... 385/12, 13, 24; 356/350, 345

[56] References Cited

U.S. PATENT DOCUMENTS

| | | | |
|---|---|---|---|
| 3,854,792 | 12/1974 | Koelle | 350/96 B |
| 4,070,091 | 1/1978 | Taylor et al. | 350/96 WG |
| 4,297,684 | 10/1981 | Butter | 340/557 |
| 4,636,029 | 1/1987 | Johansson et al. | 350/96.16 |
| 4,697,926 | 10/1987 | Youngquist et al. | 356/345 |
| 4,770,535 | 9/1988 | Kim et al. | 356/345 |
| 4,784,453 | 11/1988 | Shaw et al. | 350/96.16 |
| 4,904,863 | 2/1990 | McDearmon | 385/12 X |
| 4,904,940 | 2/1990 | Rempt | 385/12 X |
| 4,929,049 | 5/1990 | Le Goullon et al. | 385/12 |
| 5,026,139 | 6/1991 | Klainer et al. | 385/12 X |

Primary Examiner—John D. Lee
Assistant Examiner—Phan Thi Heartney
Attorney, Agent, or Firm—Jacobson, Price, Holman & Stern

[57] ABSTRACT

The present invention relates to a method to use an optical fibre as a sensor. The method involves designing an optical fibre to have a sensor area (12) where the external influence on the fibre that is to be measured, for example pressure or magnetic field, is freely able to influence the fibre. Coherent radiation is then transmitted through the sensor area in several modes. On the receiver side the radiation is split in a detector device (14) into two beams, each including the entire interference pattern created by the transmission in the fibre. After that the beams are plane-polarized in two different directions which are conducted to a signal processing device (9,9°) which detects the amplitude and/or frequency content of each beam and from this forms a signal which is a measure of their amplitude and/or frequency relation, which in its turn is a measure of the external influence in the sensor area (12).

10 Claims, 4 Drawing Sheets

METHOD TO USE AN OPTICAL FIBRE AS A SENSOR

BACKGROUND OF THE INVENTION

Fibre optical sensor technique is a field that during the last ten years has been predicted a very expanding market. The expansion has, however, not reached the pace that was predicted. The reason for this is principally the difficulty to separate the sensor information from the varying influence from the environment, both on the sensor and on the transmission to and from the sensors. Another reason is that the single-mode technique that has the highest degree of sensitivity is complex and demands that the components used are very accurate. The multimode technique, on the other hand, can allow a more simple design and moreover, it uses more robust components. Thereby it is possible to reach such a level for the costs for the fibre optical sensors that they become economically interesting. But the multimode technique has also not experienced a breakthrough, mostly due to the lower sensitivity that hitherto has been achieved with this technique. Conventional multimode technique is of cause based on principles of intensity modulation of the light that is transmitted in the core of the multimode fibre. This technique is less sensitive than the phase-sensitive detection that the single-mode technique is based on.

The fibre optical sensors have potentially very great advantages, primarily due to their non-galvanic construction, that result in for instance insensibility for EMP, EMC etc. The sensitivity that can be achieved is also as good as or better than what can be achieved with other types of sensors. Another interesting characteristic of the fibre optical sensor technique is the possibility to multiplex several sensors along the same fibre optical cable and in that way implement sensor systems that is able to cover for instance large surveillance zones. The sensors of the system can be dimensioned to be sensitive to several physical quantities such as pressure and magnetism. Great tactical advantages can be achieved by this. In order to achieve this goal the sensors have to be based upon such a technique that a realization of the sensor technique is robust and functionally reliable and this at a reasonable cost in comparison with conventional technique.

SUMMARY OF THE INVENTION

The present invention relates to a method to use an optical fibre as a sensor. The detection is phase-sensitive and can be applied to both single- and multimode fibres. The invention solves the present problem.

BRIEF DESCRIPTION OF THE DRAWINGS

In the following the invention will be described in more detail with reference to the attached drawings where.

DETAILED DESCRIPTION OF THE PREFERRED EMBODIMENTS

The suggested sensor system is based on detection of variations in the phase condition of the light that is transmitted in an optical fibre. This is a more sensitive method of measuring mechanical influence on the optical fibre than measuring the variations in the effect or the intensity of the light. A mechanical influence on the optical fibre can be translated to serve as a measuring quantity of, for instance, acoustical waves or magnet fields. It is very important that the sensor system is not sensitive to external influence from the environmental parameters, that can give rise to an increased noise level for the measuring quantity of interest. For solutions that concernes multiplexing several fiber optical sensor, this is of particular relevance. The solution according to the invention is based on a principle which among other things means that the variations in the optical fibre due to the environment are filtered out and that only significant changes caused by the measuring quantity are presented by the sensor or sensor system. The principle is described below.

In a single-mode fibre there exists only one mode for light having a wavelength above the cut off wavelength of the fibre. Light of a shorter wavelength that is transmitted in the single-mode fibre will propagate in several modes. The single-mode fibre will then act as a multimode fibre.

Figure 1:
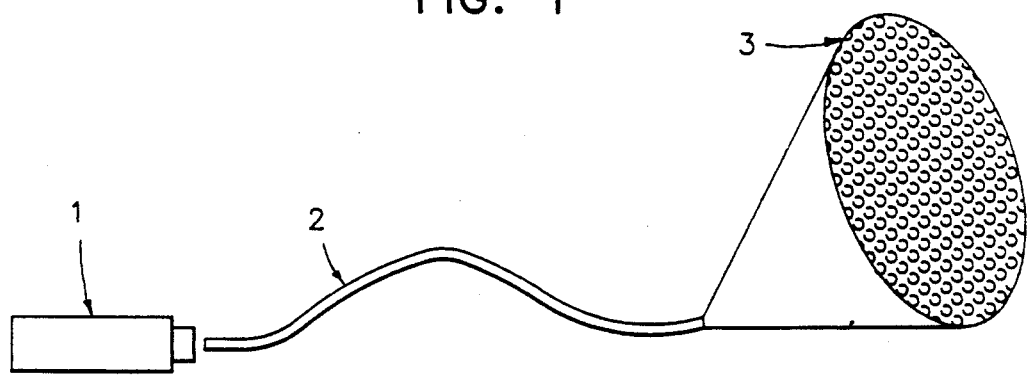
FIG. 1 shows a laser, a fibre, in which the radiation propagates in several modes and the interference pattern after the fibre.

In a multimode fibre there exists many directions of propagation due to the angle of incidence to the fibre that the incident "light rays" have. These directions of propagation are called modes. If coherent light, as in FIG. 1, from a laser 1 is transmitted in the fibre 2 and the emerging light illuminates for example a white paper, a pattern of interference 3 will appear on the paper. This pattern is usually called speckle pattern. The pattern is caused by the constructive or destructive combination of the different modes of the multimode fibre. This pattern of interference is extremely sensitive to external influence on the fibre as the relative phase relation is changed by the influence, which in its turn causes a movement of the pattern of interference. If this movement can be detected a very accurate method to detect influence on the fibre is achieved. The coherence length for the light must be longer than the difference in distance between the highest and the lowest modes.

One method to detect this pattern is to place a photo-diode on a fixed spot for instance on an intensity maximum and watch the intensity variations. The disadvantage with this is that the pattern fades due to the random phase difference between emerging modes, which do not emerge uniformly during the time. Below a method to solve the problem is given.

The phase relations can change due to changes in the spectral characteristics of the source of light caused by for instance modulation of the laser diode, by temperature variations of the source of light, by temperature variations along the optical fibre and by random distribution of the modes in the optical fibre, for instance caused by the concatination points. Such unwanted phase variations have an uniform effect on the radiation in all directions of polarisation, which is not the case for the phase variations that are caused by the external influence in the sensor areas.

Figure 2:
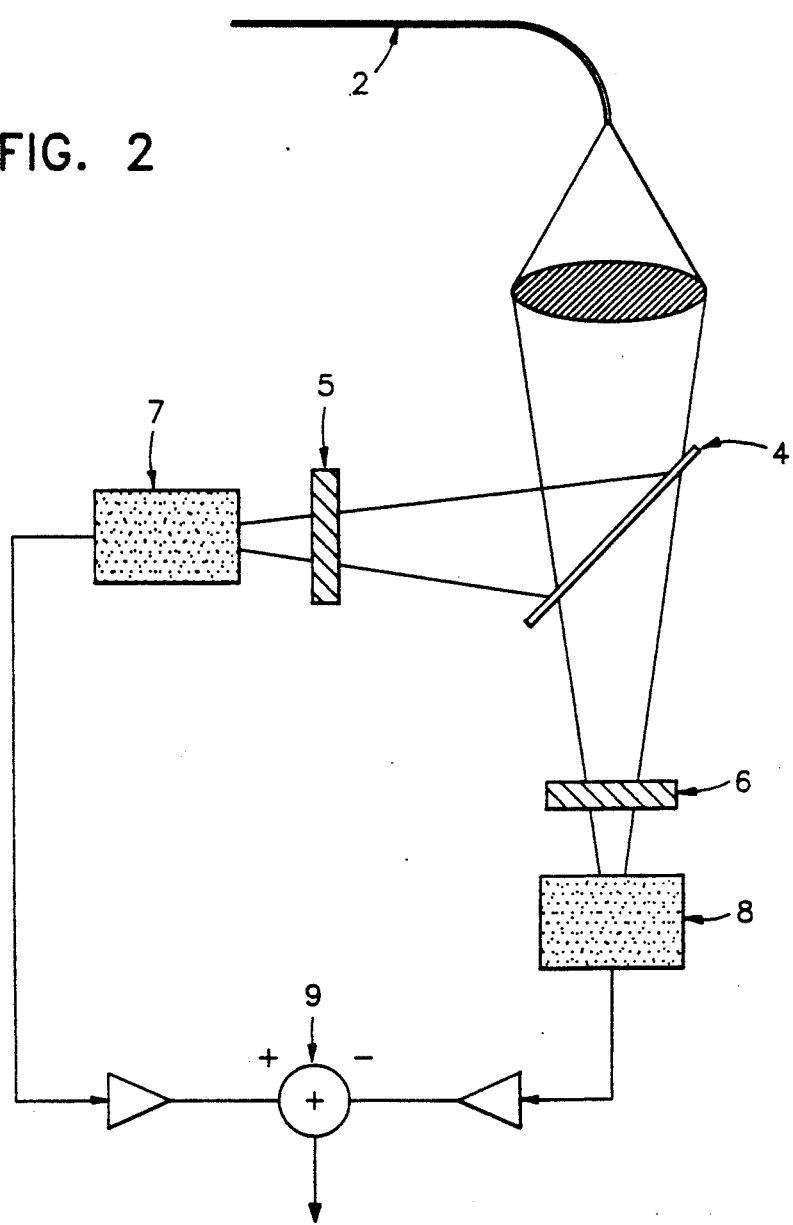
FIG. 2 shows an interference detector according to the invention.

The light emerging from the end of the fibre is therefore split by a beam splitter 4 into two beams, see FIG. 2. Each beam includes the entire interference pattern created by the transmission in the fibre. It is suitable to choose to split the beam into two beams that are on the whole equally strong, even though this is not necessary. The two beams are then plane-polarized in different directions by two polarizers 5 and 6. It is suitable to choose two directions that are essentially perpendicular to each other, even though this is not necessary. In a suitable embodiment of the invention the two emerging beams are then detected by detectors 7 and 8 independently from each other and the difference in amplitude is compared in a differential amplifier 9. The signal coming from the differential amplifier 9 is a measure of the external influence.

In stead of forming a difference signal, it is possible to form, in another type of signal processing device 9⁰, other types of signals that are a measure of the quantity one wishes to measure. Thus it is possible to detect the difference in the quotient between the two signals or the variations in the frequency distribution between them.

It is possible to use several sensors, 12 or 12 and 13, according to the invention in a sensor system. Then the radiation is transmitted in short pulses through a distribution cable 10 in the form of an optical fibre. Along the distribution cable the sensors are distributed. The radiation pulses are coupled from the distribution cable to the sensors by means of first optical couplers, that couple a certain amount of the effect of the laser pulses to the sensor and let the rest pass on to other sensors. By means of other optical couplers the radiation pulses are coupled from the sensors to one or more return cables 11 in the form of optical fibres, in which the radiation pulses from different sensors are time-multiplexed. From the return cable or cables the radiation is conducted to a signal processing device 9,9⁰ that detects the amplitude and/or frequency content of each radiation beam, and from this forms a signal that is a measure of their amplitude relation or frequency relation, which in its turn is a measure of the external influence in the sensor area. The result is presented in a presentation device.

If it is possible to make sure that all influence on the cable takes place in special sensor areas and the rest of the optical fibre, in both the distribution cable and return cable, is completely undisturbed, which is very difficult considering the tremendous sensitivity of the phase sensitive detection, then one sensor area 12 would be enough in the sensors. In practice this is not easy and above all, one does not wish to be forced to protect the distribution cables and return cables from external influence to the extent necessary in order to reach successful results. Therefore one often designs each sensor with one sensor area 12, in the form of a sensor fibre, as well as one well protected reference fibre 13. By designing the sensor in this way, it is possible to take out a reference signal at the time and place of the signal from the sensor area and by comparison with it, filter out changes just in the sensor fibre.

In a first variant of the invention, the sensor with a sensor fibre 12 and a reference fibre 13 could be made as a fibre optical ring, in which pulses of radiation is conducted. The radiation is first conducted through the reference half 13, after which a part of the radiation is conducted to the detector device. The rest will travel around in the ring and passes the sensor fibre 12 and thereafter the reference fibre 13, after which a part of the radiation is again conducted to the detector device etc. with lower and lower signal amplitude. The first signal will then be a pure reference signal.

Figure 3:
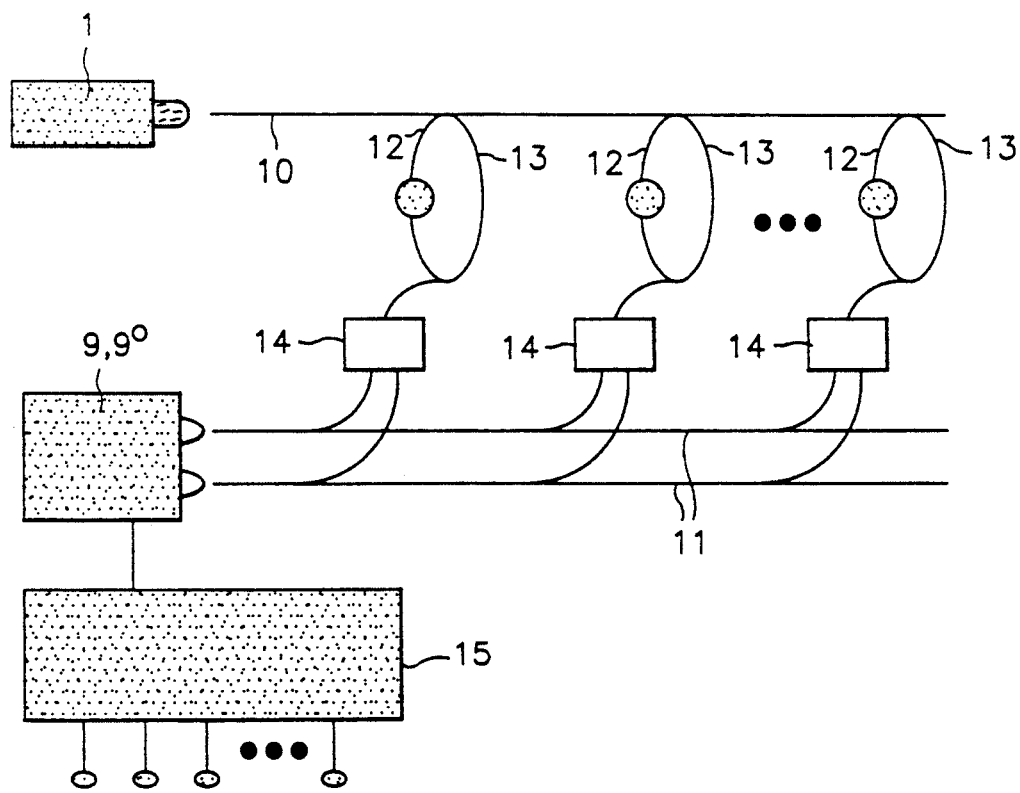
FIG. 3 shows a first sensor system according to the invention.

At least two ways to implement the system is conceivable. In the first system, according to FIG. 3, an interference detector 14 is placed after each sensor. The radiation from the detector device 14 in the two different polarisation directions are connected to a common signal processing device 9,9⁰ via separate optical fibres 11. Finally a demultiplexing takes place in a demultiplexor 15 in order to separate the radiation from the different sensors.

Figure 4:
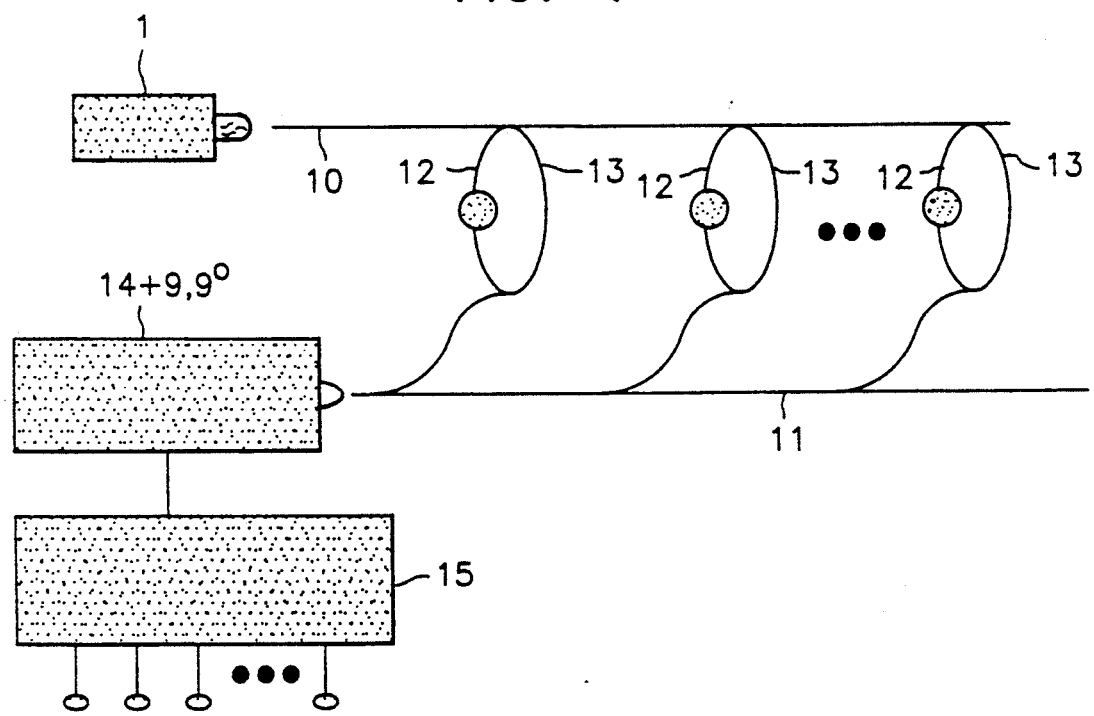
FIG. 4 shows a second sensor system according to the invention.

The second system according to FIG. 4 is on the whole similar to the first, but on the receiver side there is some difference. Thus the radiation from each sensor 12, 13 is conducted, time-multiplexed when there is several sensors, by one and the same optical fibre 11 to a common interference detector 14, that is followed by a signal processing device 9,9⁰ and a demultiplexor 15 in the same way as in the first system.

Figure 5:
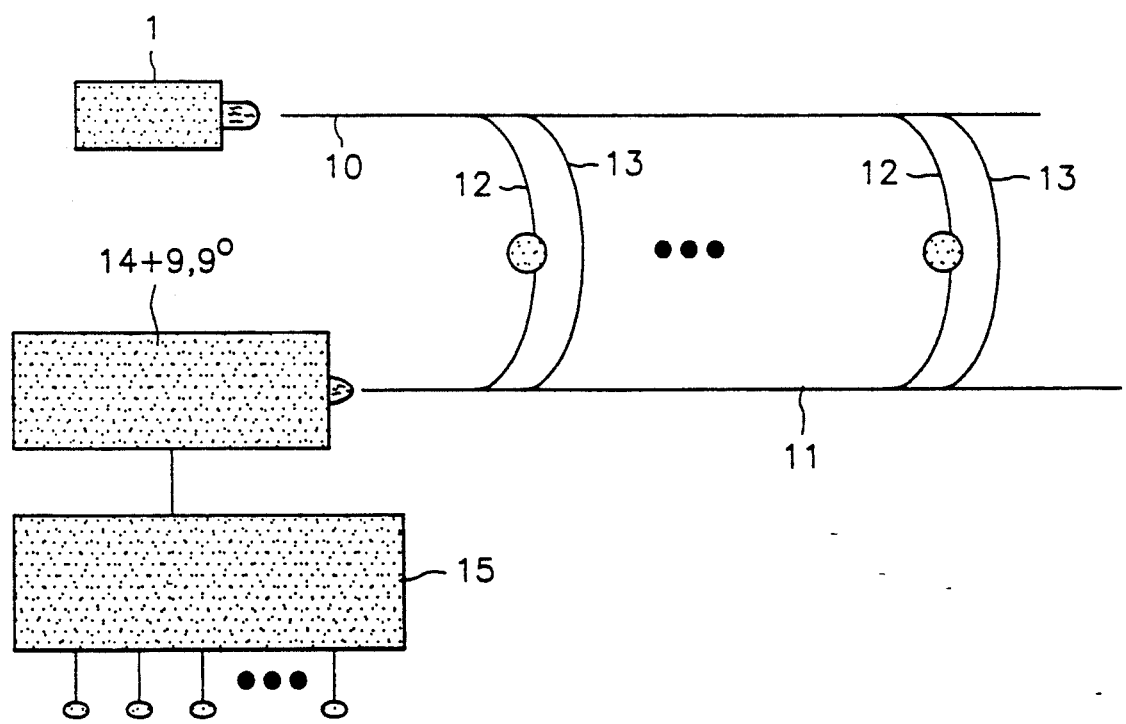
FIG. 5 shows a third sensor system according to the invention.

In stead of using a sensor ring as above, in other variants of the invention one could be using two seperate adjacent optical fibres connected in parallel, where one is a reference fibre 13 and the other a sensor fibre 12. This is shown in FIG. 5. As the signal is not running around in the sensor, in this case one only gets one reference signal and one sensor signal. In other respects the system can be designed exactly as in the two earlier mentioned cases. Besides, in practice one only considers one reference signal and one sensor signal also in the case with the sensor ring.

Figure 6:
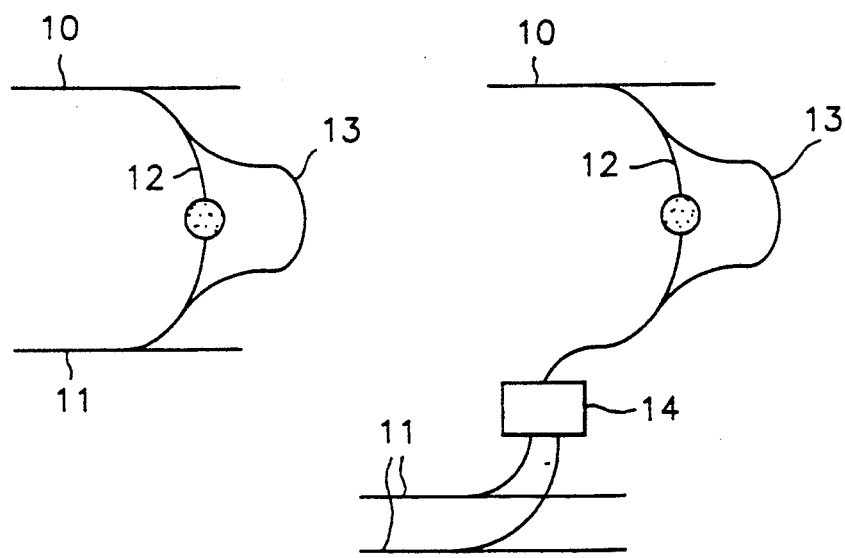
FIG. 6 shows two variants of the sensor circuit in FIG. 5

FIG. 6 shows variants of the sensor coupling in FIG. 5, which in principle gives the same situation as in this figure. Certain system related advantages can, however, occur with this method.

In some applications, especially with the sensor fibre 12 and the reference fibre 13 connected in parallel as above, it could be necessary to introduce a well defined delay in the form of a transmission line of a determined length in order to adjust the time relation between the reference signal and the sensor signal from one sensor.

It is possible to design a system, in which interference between different modes is only localized to the sensors. If one uses as distribution and return fibres 10, 11 single-mode fibres having a cut off wavelength below the wavelength of the present radiation in the system, so that the radiation is only transmitted in one mode in the fibre, no interference between different modes occur here. Then one uses for the sensor part together with the connections belonging to it either a multimode fibre or a single-mode fibre having such a high cut off wavelength that the radiation in the system have a wavelength below this cut off wavelength, so that the radiation is transmitted in several modes. This solution is perhaps most advantageous in the system according to FIG. 3.

Figure 7:
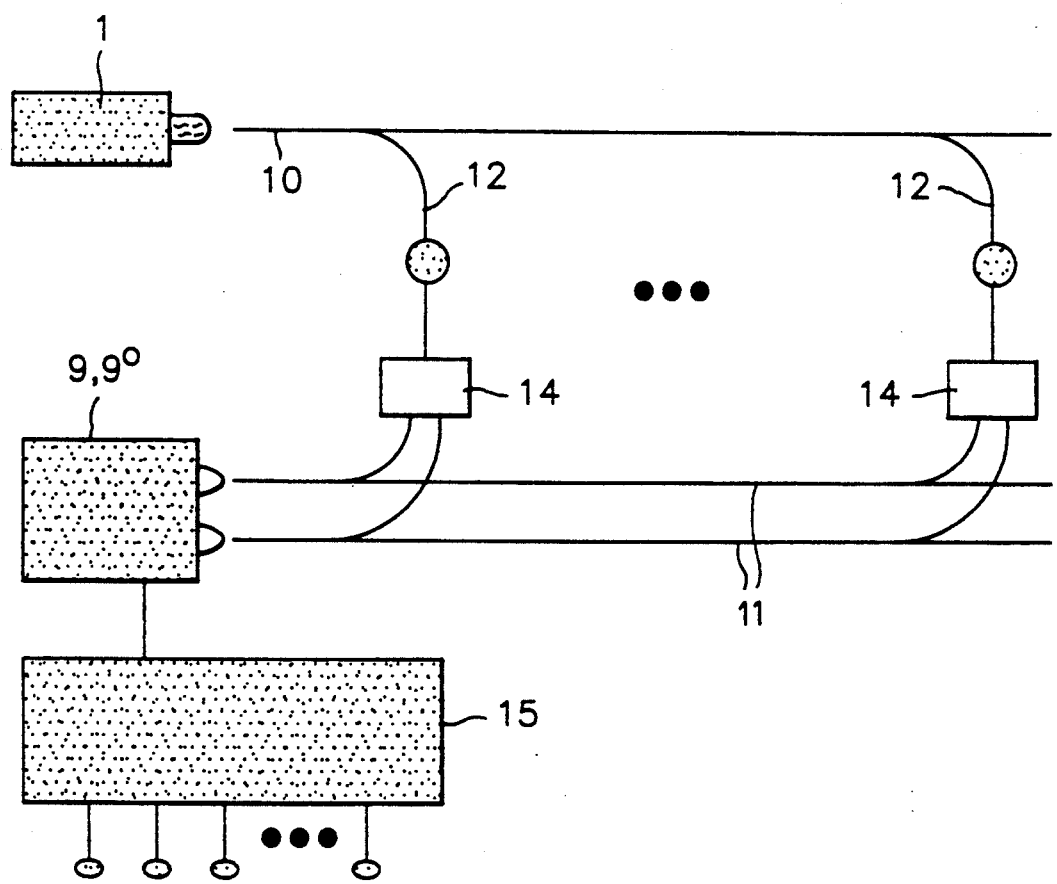
FIG. 7 shows a fourth sensor system according to the invention.

FIG. 7 shows what such a system could look like, with single-mode fibres operated in single-mode in the distribution and return fibres 10, 11 and a fibre operated in multimode as sensor fibre 12.

I claim:

1. A method to use an optical fibre as a sensor, comprising:

measuring external influence on an optical fibre in a sensor area where the external influence on the optical fibre that is to be measured, for example, pressure or magnetic field, is freely able to influence the fibre, transmitting coherent radiation through the sensor area in several modes, splitting radiation received on a receiver side of a detector device into two beams, each beam including an entire interference pattern created by transmission in the fibre, plane-polarizing the two beams in two different directions which are conducted to a signal processing device which detects the amplitude and/or frequency content of each beam, and forming a signal which is a measure of amplitude and/or frequency relation of the beams, which is a measure of the external influence in the sensor area.

2. A method according to claim 1, wherein the radiation is split into two beams of the same intensity.

3. A method according to claim 1, wherein the beams are plane-polarized in two perpendicular directions.

4. A method according to claim 1, wherein the radiation is transmitted in short pulses along a distribution cable in the form of an optical fibre and coupled by first optical couplers along the distribution cable to a number of sensors, each comprising a sensor area, that the radiation from the sensors is coupled by second optical couplers to one or more return cables in the form of optical fibres, in which the pulses of radiation is wavelength multiplexed.

5. A method according to claim 1, wherein each sensor is two adjacent parts of optical fibres, one of which is a reference fibre and the other a sensor fibre.

6. A method according to claim 5, wherein each sensor is designed as a fibre optical ring, in which the radiation is conducted, said ring having a reference half, to which the radiation is first conducted, and a sensor half, that the radiation is conducted to the detector device from the reference half, which result in the first signal to the detector device being a pure reference signal, after which follows signals that have passed the sensor fibre and the reference fibre a successively increasing number of times.

7. A method according to claim 5, wherein each sensor is two separate optical fibres connected in parallel.

8. A method according to claim 4, wherein a detector device is placed after each sensor, from which devices the radiation in the two directions of polarisation is conducted in an optical fibre each to a common signal processing device and then, in a system with several sensors, to a demultiplexor.

9. A method according to claim 4, wherein the radiation from the sensors is conducted in one optical fibre to a common detector device and a signal processing device and then, in a system with several sensors, to a demultiplexor.

10. A method according to claim 1, wherein only those parts of a fibre that is part of a sensor is chosen such that the radiation is transmitted in several modes, while the other parts of the fibre is chosen such that the radiation is transmitted in only one mode.

* * * * *